United States Patent
Fujiwara et al.

(10) Patent No.: US 6,576,366 B1
(45) Date of Patent: Jun. 10, 2003

(54) NON-AQUEOUS ELECTROLYTE SECONDARY CELL, AND MATERIAL FOR NEGATIVE ELECTRODE USED THEREFOR

(75) Inventors: Takafumi Fujiwara, Osaka (JP); Harunari Shimamura, Osaka (JP); Takayuki Nakamoto, Osaka (JP); Yoshiaki Nitta, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/673,753

(22) PCT Filed: Jan. 31, 2000

(86) PCT No.: PCT/JP00/00498
§ 371 (c)(1), (2), (4) Date: Oct. 20, 2000

(87) PCT Pub. No.: WO00/51196
PCT Pub. Date: Aug. 31, 2000

(30) Foreign Application Priority Data

Feb. 22, 1999 (JP) ............................................. 11-042536

(51) Int. Cl.⁷ .......................... H01M 4/58; C01B 33/00; C01B 33/20
(52) U.S. Cl. ............... 429/218.1; 429/231.6; 423/331; 423/324
(58) Field of Search ................... 429/218.1, 231.6; 423/324, 331; 252/519.14, 521.3, 519.15, 521.2, 521.4

(56) References Cited

U.S. PATENT DOCUMENTS

| | | | | | |
|---|---|---|---|---|---|
| 5,571,637 A | * | 11/1996 | Idota | ..................... | 429/231.3 |
| 5,620,812 A | * | 4/1997 | Tahara et al. | ............... | 429/220 |
| 5,733,680 A | * | 3/1998 | Hong | ....................... | 29/623.1 |
| 5,922,491 A | * | 7/1999 | Ikawa et al. | ............... | 358/1.15 |
| 5,989,747 A | * | 11/1999 | Tanaka et al. | ............... | 429/209 |
| 6,338,916 B1 | * | 1/2002 | Irie et al. | ..................... | 420/900 |
| 2002/0037454 A1 | * | 3/2002 | Tsuruta et al. | ........... | 429/218.2 |

FOREIGN PATENT DOCUMENTS

| | | |
|---|---|---|
| JP | 07130358 | 5/1995 |
| JP | 07240201 | 9/1995 |
| JP | 08138744 | 5/1996 |
| JP | 09063651 | 3/1997 |
| JP | 10162823 | 6/1998 |
| JP | 10294112 | 11/1998 |
| JP | 10302770 | 11/1998 |
| JP | 10312804 | 11/1998 |
| JP | 10321226 | 12/1998 |
| JP | 11-25973 | 1/1999 |
| JP | 11007979 | 1/1999 |
| JP | 11102699 | 4/1999 |
| JP | 11-176470 | 7/1999 |
| JP | 2000036323 | 2/2000 |

OTHER PUBLICATIONS

International Search Report for PCT/JP00/00498 dated May 2, 2000.

* cited by examiner

Primary Examiner—Patrick Ryan
Assistant Examiner—Gregg Cantelmo
(74) Attorney, Agent, or Firm—RatnerPrestia

(57) ABSTRACT

In cycles of charging and discharging, an excellent capacity maintenance rate is obtained. The charging and discharging cycle characteristic of battery is enhanced. Further, an excellent initial discharging capacity is obtained. A negative electrode, a positive electrode, and a non-aqueous electrolyte are contained. The negative electrode includes an alloy of Si, a first element and a second element. The first element includes at least one element selected from the group consisting of the second group element except Mg in the periodic table, transition elements, twelfth group element, thirteenth group element except B, and fourteenth group element except Si. The second element includes at least one element of B and Mg.

8 Claims, 1 Drawing Sheet

NON-AQUEOUS ELECTROLYTE SECONDARY CELL, AND MATERIAL FOR NEGATIVE ELECTRODE USED THEREFOR

This application is a U.S. national phase application of PCT international application PCT/JP00/00498.

TECHNICAL FIELD

The present invention relates to a non-aqueous electrolyte secondary battery (cell), and more particularly to a negative electrode material used therein.

BACKGROUND ART

Generally, a lithium secondary battery has a high electromotive force and a high energy density. Lithium secondary batteries are used in portable information terminal, mobile communication appliance, portable electronic devices, household small power storage unit, motorcycle, electric vehicle, hybrid electric car, etc.

A lithium secondary battery using lithium metal as negative electrode material has a high energy density. When charging, however, dendrite deposits into the negative electrode, and as charging and discharging are repeated, the dendrites breaks through the separator to reach the positive electrode side, thereby causing internal short circuit. Besides, the depositing dendrite has a large specific surface area, and is high in reaction activity. Therefore, the dendrite depositing on the surface of the negative electrode reacts with the solvent in the electrolyte solution, and an interface film like a solid electrolyte lacking in electron conductivity is formed on the surface of the negative electrode. As a result, the internal resistance of the battery is raised, or particles isolated from the network of electron conduction are formed. These factors cause to lower the charging and discharging efficiency.

As a negative electrode material replacing the lithium metal, a carbon material capable of occluding and emitting lithium ions is used. Usually, metal lithium does not deposit on the carbon material negative electrode. Hence, internal short circuit by dendrite does not take place. However, the theoretical capacity of graphite which is one of the carbon materials is 372 mAh/g, and this theoretical capacity is about one-tenth of the theoretical capacity of Li metal alone.

As other negative electrode material, a single metal material or a single nonmetal material capable of forming a compound with lithium is known. For example, among compounds of silicon (Si) and lithium, the composition of the compound having the highest lithium content is $Li_{22}Si_5$. In this range, usually, metal lithium does not deposit. Therefore, internal short circuit by dendrite does not occur. The electrochemical capacity of these compounds and various single materials is 4199 mAh/g, and this capacity is larger than the theoretical capacity of graphite.

As other compound negative electrode material, a nonferrous metal silicide composed of transition element is disclosed in Japanese Laid-open Patent No. 7-240201. A negative electrode material made of an inter-metallic compound containing at least one of 4B group elements, and P, and Sb, of which crystal structure is any one of $CaF_2$ type, ZnS type, and AlLiSi type is disclosed in Japanese Laid-open Patent No. 9-63651. Further, inter-metallic compounds expressed by $AB_2$ type are disclosed in Japanese Laid-open Patent No. 10-312804 and Japanese Laid-open Patent No. 10-302770.

Still more, inter-metallic compounds based on Si or Sn, and alloys and other similar negative electrode materials are disclosed in Japanese Laid-open Patent No. 10-162823, Japanese Laid-open Patent No. 10-294112, Japanese Laid-open Patent No. 10-302770, and Japanese Laid-open Patent No. 10-312804.

However, these negative electrode materials having a higher capacity than the carbon material have the following problems.

Negative electrode materials such as single metal materials and single nonmetal materials capable of forming compounds with lithium are commonly inferior in charging and discharging cycle characteristic as compared with carbon negative electrode materials. The reason is not clear, but is estimated as follows.

For example, silicon contains eight silicon atoms in its crystallographic unit lattice (cubic system, space group Fd-3m). Converting from its lattice constant a=0.5420 nm, the unit lattice volume is 0.1592 $nm^3$, and the volume per one silicon atom is $19.9 \times 10^{-3}$ $nm^3$. Judging from the two-element phase diagram of silicon and lithium, it is estimated that two phases of silicon and compound $Li_{12}Si_7$ coexist in the initial stage of reaction of electrochemical compound formation between silicon and lithium at room temperature. A crystallographic unit lattice (orthorhombic system, space group Pnma) of $Li_{12}Si_7$ contains 56 silicon atoms. Converting from its lattice constant a=0.8610 nm, b=1.9737 nm, c=1.4341 nm, the unit lattice volume is 2.4372 $nm^3$, and the volume per one silicon atom is $43.5 \times 10^{31\ 3}$ $nm^3$. The volume per one silicon atom is calculated by dividing the unit lattice volume by the number of silicon atoms in the unit lattice. According to calculation from this value, when silicon reacts to form a compound $Li_{22}Si_7$, the material volume expands by 2.19 times. By reaction in two-phase coexistent state of silicon and compound $Li_{12}Si_7$, since silicon is partly transformed into the compound $Li_{12}Si_7$, their volume difference increases, the material is largely distorted, and cracks are likely to occur and the particles become finer. Further, when an electrochemical reaction to form compound of lithium and silicon is promoted, finally, the compound $Li_{22}Si_5$ having the highest lithium content is formed. A crystallographic unit lattice (cubic system, space group F23) of $Li_{22}Si_5$ contains 80 silicon atoms. Converting from its lattice constant a=1.8750 nm, the unit lattice volume is 6.5918 $nm^3$, and the volume per one silicon atom is $82.4 \times 10^{-3}$ $nm^3$. This value is 4.14 times that of single silicon, and the material is largely expanded. In discharge reaction of negative electrode material, lithium is decreased in the compound, and the material contracts in the process of this reaction. Thus, since the volume difference is significant between charging time and discharging time, a large distortion occurs in the material, which is regarded as the cause of cracking and pulverization of particles. Further, a space is formed in the finer particles, and the electron conduction network is broken, and the portion not engaged in the electrochemical reaction increases, thereby lowering the charging and discharging capacity.

That is, the reason of poor charging and discharging cycle characteristic of the single metal material and single nonmetal material capable of forming a compound with lithium, as compared with the carbon negative electrode material, is estimated to be the volume change and the texture change caused by such volume change.

On the other hand, negative electrode materials made of an inter-metallic compound containing at least one of silicide such as nonferrous metal of transition element, 4B group elements, P, and Sb, of which crystal structure is any one of $CaF_2$ type, ZnS type, and AlLiSi type is disclosed in Japanese Laid-open Patent No. 7-240201 and Japanese Laid-open Patent No. 9-63651.

The battery using the silicide negative electrode material of nonferrous metal composed of transition element disclosed in Japanese Laid-open Patent No. 7-240201 has an improved charging and discharging cycle characteristic as compared with the battery using lithium metal negative electrode material. It is estimated from the battery capacity measured after 1 cycle, 50 cycles and 100 cycles in the embodiment and comparative example described in the prior art. However, this battery using the silicide negative electrode material is increased in the battery capacity by only about 12% at maximum as compared with the battery using natural graphite negative electrode material. That is, although not clearly stated in the specification of the prior art, the silicide negative electrode material of nonferrous metal composed of transition element does not seem to increase the capacity significantly as compared with the graphite negative electrode material.

The battery using the negative electrode material disclosed in Japanese Laid-open Patent No. 9-63651 has an improved charging and discharging cycle characteristic as compared with the battery using Li-Pb alloy negative electrode material, and has a higher capacity than the battery using the graphite negative electrode material. However, in a range of 10 to 20 charging and discharging cycles, the discharge capacity is decreased significantly. In the battery Using $Mg_2Sn$ which is estimated to be most favorable, the discharge capacity is decreased to about 70% of the initial capacity in about 20 cycles.

Materials disclosed in Japanese Laid-open Patent No. 10-162823 and Japanese Laid-open Patent No. 10-294112 are materials containing Sn or Si, in which Sn or Si is contained by more than about 50 atom % of the whole material. Indeed, a battery of a higher capacity is obtained by increasing the content of Sn or Sn in the material. Further, the cycle characteristic is slightly improved as compared with the material using Sn or Si alone. However, in the battery containing by more than about 50 atom % of Sn or Si, when charging and discharging are repeated more than 100 cycles, the cycle deterioration of the battery characteristic is emphasized by expansion and shrinkage of material occurring in every cycle.

Materials disclosed in Japanese Laid-open Patent No. 10-302770 and Japanese Laid-open Patent No. 10-312804 are $AB_2$ type inter-metallic compounds, and have an excellent coulomb efficiency and rate characteristic. In the battery using these materials, the initial discharge capacity is larger as compared with the battery using the conventional graphite. However, the discharge capacity in 10 cycles of the battery using these materials is already lowered to the capacity maintenance rate of 90% order, and these materials do not have excellent cycle characteristic.

SUMMARY OF THE INVENTION

A non-aqueous electrolyte secondary battery (cell) of the invention comprises a negative electrode, a positive electrode, and a non-aqueous electrolyte, in which the negative electrode contains an alloy having Si, a first element and a second element, the first element includes at least one element selected from the group consisting of a second group element except Mg in the periodic table, transition elements, a twelfth group element, a thirteenth group element except B, and a fourteenth group element except Si, and the second element includes at least one element of B and Mg.

A negative electrode material for non-aqueous electrolyte secondary battery of the invention comprises Si, a first element, and a second element, in which the first element includes at least one element selected from the group consisting of a second group element except Mg in the periodic table, transition elements, a twelfth group element, a thirteenth group element except B, and a fourteenth group element except Si, and the second element includes at least one element of B and Mg.

Preferably, the first element is at least one element of Ni and Co.

Preferably, the second element is contained in a range of 0.1 part by weight to 30 parts by weight in 100 parts by weight of the sum of weight of Si and first element.

In this composition, a secondary battery having a high capacity and an excellent charging and discharging cycle characteristic is obtained.

BEST MODE FOR CARRYING OUT THE INVENTION

Figure 1:
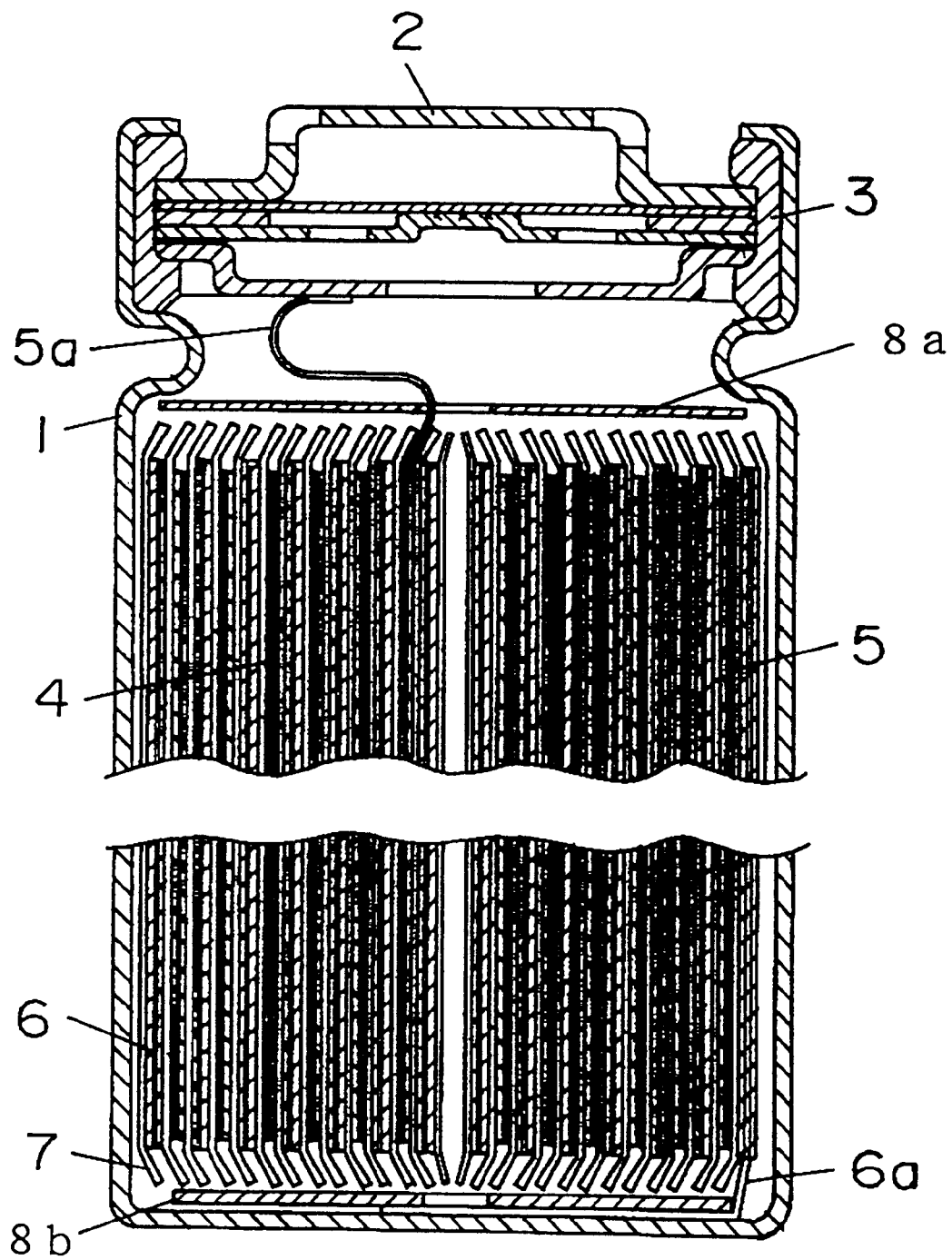
FIG. 1 is a longitudinal sectional view of a non-aqueous electrolyte secondary battery in embodiment of the invention.

A non-aqueous electrolyte secondary battery (cell) in embodiment of the invention comprises a non-aqueous electrolyte, a separator, and a positive electrode and a negative electrode capable of occluding and emitting lithium. The negative electrode is made of a negative electrode material, and this negative electrode comprises silicon (Si), and an alloy made of at least one element selected from a first element group (M1) and at least one element selected from a second element group (M2). Elements in the M1 include at least one element selected from the group consisting of group 2 elements except magnesium (Mg) in the periodic table, transition elements, the twelfth group element, thirteenth group element except boron (B), and fourteenth group element except Si. The M2 includes at least one element of B and Mg.

The negative electrode includes a negative electrode current collector and a negative electrode compound disposed in this negative electrode current collector. The negative electrode compound comprises a negative electrode material, a negative electrode conductive material, and a negative electrode binder. The negative electrode forms a negative electrode plate.

The positive electrode includes a positive electrode current collector and a positive electrode compound disposed in this positive electrode current collector. The positive electrode compound comprises a positive electrode material, a positive electrode conductive material, and a positive electrode binder. The positive electrode forms a positive electrode plate.

First, for the purpose of suppressing the expansion and shrinkage of the battery using Si having a high capacity at the time of charging and discharging, the present inventors attempted to add various alloying elements to Si. As a result, the non-aqueous electrolyte secondary battery using the negative electrode material composed of Si by adding at least one element (M1) selected from the group consisting of the second group element in the periodic table, transition elements, twelfth group element, thirteenth group element, and fourteenth group element except Si successfully suppressed expansion and contraction at the time of charging and discharging as compared with the negative electrode material using Si alone. Hence, an excellent charging and discharging cycle characteristic is obtained. However, the cycle characteristic of the non-aqueous electrolyte secondary battery using the negative electrode material adding this element M1 to Si was inferior to the cycle characteristic of the conventional non-aqueous electrolyte secondary battery using graphite material as the negative electrode.

On the other hand, a different non-aqueous electrolyte secondary battery was prepared by using a negative electrode material adding at least one element (M2) of B and Mg to the alloy of Si and M1 element. As a result of measurement of charging and discharging cycle characteristic of this non-aqueous electrolyte secondary battery, a better charging and discharging cycle characteristic was obtained as compared with the battery using the alloy of Si and M1 as the negative electrode material. To analyze the cause, we observed the distribution state of Si element in the alloy particles by means of EPMA (electron probe X-ray microanalyzer). By adding the element M2 selected from B and Mg, hence, segregation of Si element in the alloy is suppressed, and it is confirmed that the dispersion state of Si is improved. That is, by adding the element M2 selected from B and Mg, the dispersion state of Si becomes favorable, and the reaction of Si and Li occurring in the alloy particles at the time of charging and discharging becomes much uniform. It hence suppresses expansion and contraction due to charging and discharging. As a result, it is estimated that a favorable cycle characteristic is obtained.

The negative electrode material used in the non-aqueous electrolyte secondary battery in an embodiment of the invention is obtained by quenching and solidifying the components of elements for composing the negative electrode material by dry spraying method, wet spraying method, roll quenching method, rotating electrode method or other method. Yet, a negative electrode material prepared by other cooling method may be also prepared by a sufficiently cooling method.

In other manufacturing method of negative electrode material, elements for composing the negative electrode material are mixed by charging into a high energy mill such as planetary ball mill or agitating mill, and thus the negative electrode material is prepared by mechanical alloying method or the like.

Also, for the purpose of removing the internal stress or adjusting the texture, the material obtained by such quenching method or mechanical alloying method may be heated.

As the conductive material used in the negative electrode of the secondary battery of the embodiment, a material having an electron conductivity may be used. Specifically, as the conductive material, for example, graphite, carbon black, conductive fiber, organic conductive material, and others may be used either alone or in mixture. Examples of graphite include natural graphite (flake graphite, etc.), artificial graphite, and expanded graphite. Examples of carbon black include acetylene black, Ketien black, channel black, furnace black, lamp black, and thermal black. Examples of metal powder include carbon fiber, metal fiber, other conductive fiber, copper, and nickel. As the organic conductive material, polyphenylene derivative and others may be used. Among these conductive materials, artificial graphite, acetylene black, and carbon fiber are particularly preferable. The content of the conductive material is not particularly specified, but it is preferred to add in a range of 1 part by weight to 50 parts by weight in 100 parts by weight of the negative electrode material, and more preferably in a range of 1 part by weight to 30 parts by weight. Since the negative electrode material itself is electron conductive, it is also possible to compose the negative electrode without containing conductive material.

As the binder used in the negative electrode for the secondary battery of the embodiment, a thermoplastic resin or thermosetting resin may be used. Examples of binder include, among others, polyethylene, polypropylene, polytetrafluoroethylene (PTFE), polyvinylidene fluoride (PVDF), styrene butadiene rubber, tetrafluoroethylene-hexafluoroethylene copolymer, tetrafluoroethylene-hexafluoropropylene copolymer (FE P), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene chloride-pentafluoropropylene copolymer, propylene-tetrafluoroethylene copolymer, ethylene-chlorotrifluoroethylene copolymer (ECTFE), vinylidene chloride-hexafluoropropylene-tetrafluoroethylene copolymer, vinylidene fluoride-perfluoromethyl vinyl ether-tetrafluoroethylene copolymer, ethylene-acrylic acid copolymer or (Na+) ion crosslinked polymer of this material, ethylene-methacrylic acid copolymer or (Na+) ion crosslinked polymer of this material, ethylene-methyl acrylate copolymer or (Na+) ion crosslinked polymer of this material, and ethylene-methyl methacrylate copolymer or (Na+) ion crosslinked polymer of this material. These resins may be used either alone or in mixture. Particularly preferable materials are styrene butadiene rubber, vinylidene polyfluoride, ethylene-acrylic acid copolymer or (Na+) ion crosslinked polymer of this material, ethylene-methacrylic acid copolymer or (Na+) ion crosslinked polymer of this material, ethylene-methyl acrylate copolymer or (Na+) ion crosslinked polymer of this material, and ethylene-methyl methacrylate copolymer or (Na+) ion crosslinked polymer of this material.

As the current collector used in the negative electrode for the secondary battery of the embodiment, an electron conductor not inducing chemical change in the composed battery may be used. For example, materials of current collector include stainless steel, nickel, copper, titanium, carbon, and conductive resin. Further, as the material for the current collector, copper or stainless steel of which surface is treated with carbon, nickel or titanium may be used. In particular, copper or copper alloy is preferred. Such materials of which surface is oxidized may be also used. The current collector is preferred to have an undulated surface. Such undulated surface is formed by, for example, surface treatment. The current collector may be prepared in various forms, including foil, film, sheet, net, punching, lath, porous matter, foamed matter, and fiber group. The thickness of the current collector is not particularly specified, but may be generally in a range of 1 to 500 $\mu$m.

As the positive electrode material used in the positive electrode of the secondary battery of the embodiment, either a compound containing lithium or a compound not containing lithium can be used. Examples of positive electrode material include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$. Herein, M is at least one selected from Na, Mg, Sc, Y, Mn, Fe, Co, Ni, Cu, Zn, Al, Cr, Pb, Sb, and B. Further, x=0 to 1.2, y=0 to 0.9, and z=2.0 to 2.3. The value of x is a value before start of charging and discharging, and the value of x increases or decreases due to charging and discharging. The positive electrode material includes transition metal chalcogenide, vanadium oxide, lithium compound of vanadium oxide, niobium oxide, lithium compound of niobium oxide, conjugate polymer using organic conductive substance, and Chevreul phase compound, etc. As the positive electrode, further, a mixed material of plural different materials can be also used. The positive electrode material as the positive electrode active material is not particularly limited, but powder with mean particle size in a range of 1 to 30 μm may be used.

As the positive electrode conductive material used in the positive electrode of the secondary battery of the embodiment, an electron conductive material not inducing chemical changes at the charging and discharging potential of the positive electrode material being used therein is used. Specifically, as the positive electrode conductive material, for example, graphite, carbon black, conductive fiber, metal powder, conductive whisker, conductive metal oxide, carbon fluoride, organic conductive material, and others may be used either alone or in mixture. Examples of graphite include natural graphite (flake graphite, etc.), artificial graphite, and others. Examples of carbon black include acetylene black, Ketien black, channel black, furnace black, lamp black, and thermal black. As the conductive fiber, carbon fiber or metal fiber is used. As the metal powder, aluminum or the like is used. Conductive whisker includes zinc oxide and potassium titanate. As the conductive metal oxide, titanium oxide or the like is used. As the organic conductive material, polyphenylene derivative and others may be used. Among these conductive materials, artificial graphite and acetylene black are particularly preferable. The content of the conductive material is not particularly specified, but it is preferred to add in a range of 1 part by weight to 50 parts by weight in 100 parts by weight of the positive electrode material, and more preferably in a range of 1 part by weight to 30 parts by weight. Further, 2 to 15 parts by weight of carbon or graphite is particularly preferred.

As the positive electrode binder used in the positive electrode for the secondary battery of the embodiment, a thermoplastic resin or thermosetting resin may be used. Examples of binder include, among others, polyethylene, polypropylene, polytetrafluoroethylene (PTFE), polyvinylidene fluoride (PVDF), styrene butadiene rubber, tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene chloride-pentafluoropropylene copolymer, propylene-tetrafluoroethylene copolymer, ethylene-chlorotrifluoroethylene copolymer (ECTFE), vinylidene chloride-hexafluoropropylene-tetrafluoroethylene copolymer, vinylidene fluoride-perfluoromethyl vinyl ether-tetrafluoroethylene copolymer, ethylene-acrylic acid copolymer or (Na+) ion crosslinked polymer of this material, ethylene-methacrylic acid copolymer or (Na+) ion crosslinked polymer of this material, ethylene-methyl acrylate copolymer or (Na+) ion crosslinked polymer of this material, and ethylene-methyl methacrylate copolymer or (Na+) ion crosslinked polymer of this material. These materials may be used either alone or in mixture. Particularly preferable binders are vinylidene polyfluoride (PVDF) and polytetrafluoroethylene (PTFE).

As the positive electrode current collector used in the positive electrode of the secondary battery of the embodiment, an electron conductor not inducing chemical changes at the charging and discharging potential of the positive electrode material being used may be used. For example, materials of positive electrode current collector include stainless steel, aluminum, titanium, carbon, and conductive resin. Further, as the material for the positive electrode current collector, aluminum or stainless steel of which surface is treated with carbon or titanium may be used. In particular, aluminum or aluminum alloy is preferred as the positive electrode current collector. Such materials of which surface is oxidized may be also used as the current collector. The current collector is preferred to have an undulated surface. Such undulated surface is formed by, for example, surface treatment. The current collector may be prepared in various forms, including foil, film, sheet, net, punching, lath, porous matter, foamed matter, fiber group, and non-woven cloth. The thickness of the current collector is not particularly specified, but may be generally in a range of 1 to 500μm.

The electrode compound contains filler, dispersant, ion conductor, pressure intensifier, and other additives. They are added to the conductive material and binder. As the filler, for example, a fibrous material not inducing chemical changes in the composed battery is used. Examples of filler include polypropylene, polyethylene, other olefin polymer, glass, and carbon. The content of the filler is not particularly limited, but is preferred to be in a range of 0 to 30 parts by weight in 100 parts by weight of the electrode compound.

In the secondary battery of the embodiment, the negative electrode plate containing the negative electrode compound is disposed so as to confront the positive electrode plate containing the positive electrode compound.

The non-aqueous electrolyte used in the embodiment contains a non-aqueous solvent, and a support salt dissolved in this solvent. As the support salt, lithium salt is used. The non-aqueous electrolyte contains a non-aqueous electrolyte solution. Examples of nonaqueous solvent include cyclic carbonate, chain carbonate, aliphatic carboxylic ester, chain ether, cyclic ether, and non-protonic organic solvent.

The cyclic carbonate includes ethylene carbonate (EC), propylene carbonate (PC), butylene carbonate (BC), and vinylene carbonate (VC). The chain carbonate includes dimethyl carbonate (DMC), diethyl carbonate (DEC), ethyl methyl carbonate (EMC), and dipropyl carbonate (DPC). The aliphatic carboxylic ester includes methyl formate, methyl acetate, methyl propionate, and ethyl propionate. The γ-lactone includes γ-butyrolactone and others. The chain ether includes 1,2-dimethoxy ethane (DME), 1,2-diethoxy ethane (DEE), and ethoxy methoxy ethane (EME). The cyclic ether includes tetrahydrofuran, 2-methyl tetrahydrofuran, etc. The nonprotonic organic solvent includes, for example, dimethyl sulfoxide, 1,3-dioxolane, formamide, acetamide, dimethyl formamide, dioxolane, acetonitrile, propyl nitrile, nitromethane, ethyl monoglyme, triester phosphate, trimethoxy methane, dioxolane derivative, sulfolane, methyl sulfolane, 1,3-dimethyl-2-imidazolidinone, 3-methyl-2-oxazolidinone, propylene carbonate derivative, tetrahydrofuran derivative, ethyl ether, 1,3-propansaltone, anisole, dimethyl sulfoxide, and N-methyl pyrrolidone. These nonaqueous solvents may be used either alone or as a mixed solvent of two or more kinds. In particular, a mixed solvent of cyclic carbonate and chain carbonate, or a mixed solvent of cyclic carbonate, chain carbonate, and aliphatic carboxylic ester is preferred.

The lithium salt used in the embodiment includes, for example, $LiClO_4$, $LiBF_4$, $LiPF_6$, $LiAlCl_4$, $LiSbF_6$, LISCN, LiCl, $LiCF_3SO_3$, $LiCF_3CO_2$, $Li(CF_3SO_2)_2$, $LiAsF_6$, $LiN(CF_3SO_2)_2$, $LIB_{10}Cl_{10}$, lower aliphatic lithium carboxylate, LiCl, LiBr, LiI, chloroborane lithium, tetraphenyl lithium borate, and imide. These compounds may be used either alone or in a combination of two or more kinds. In particular, the lithium salt containing $LiPF_6$ is preferred.

Preferably, the non-aqueous electrolyte contains at least ethylene carbonate and ethyl methyl carbonate, and also contains $LiPF_6$ as support salt. The required amount of these electrolyte materials is used depending on the amount of the positive electrode material and negative electrode material, and the size of the battery. The dissolved amount of support salt in the non-aqueous electrolyte is not particularly limited, but is preferred to be in a range of 0.2 mol/L to 2 mol/L. More preferably, it should be in a range of 0.55 mol/L to 1.5 mol/L.

Further, for the purpose of improving the discharging characteristic and the charging and discharging characteristic, it is also effective to add other compound to the electrolyte. Other compounds to be added may include, for example, triethyl phosphite, triethanol amine, cyclic ether, ethylene diamine, n-glyme, pyridine, hexatriamide phosphate, nitrobenzene derivative, crown ether, quaternary ammonium salt, and ethylene glycol dialkyl ether.

The separator used in the embodiment is a microporous thin film having a large ion permeability, specified mechanical strength, resistance to organic solvent, and hydrophobic electric insulation. The material for the separator is preferred to have a function of closing pores and raising the resistance at a specific temperature or higher. As the separator, for example, a sheet made of olefin polymer or glass fiber, a non-woven cloth, or a woven cloth is used. The olefin polymer is polypropylene, polyethylene, or olefin polymer combining them. The separator has multiple pores, and each pore size is preferred to be in a range not to pass the positive and negative electrode material, binder or conductive material dissociated from the electrode. Preferably, the pore size is in a range of 0.01 to 1 $\mu$m. The thickness of the separator is 10 to 300 $\mu$m. The void rate of pores is determined depending on the electron or ion permeability, material or film pressure, and is generally preferred to be in a range of 30% to 80%.

Other non-aqueous electrolyte secondary battery of the embodiment comprises a negative electrode, a positive electrode, a separator disposed between the negative electrode and positive electrode, and an organic electrolyte solution. The organic electrolyte solution contains an organic solvent, and a lithium salt dissolved in the organic solvent. The separator is placed between the negative electrode and positive electrode. The negative electrode has a negative electrode compound containing a negative electrode material and a first polymer material. The organic electrolyte solution is absorbed and held in the first polymer. The positive electrode has a positive electrode compound containing a positive electrode material and a second polymer. The organic electrolyte solution is absorbed and held in the second polymer. The separator contains a third polymer material capable of absorbing and holding the organic electrolyte solution, and has multiple pores. The separator, positive electrode, and negative electrode are formed integrally. As this polymer material, a material capable of absorbing and holding the organic electrolyte solution is used. In particular, as the polymer material, a copolymer of vinylidene fluoride and hexafluoropropylene is preferred.

The shape of the battery is any one of coin type, button type, sheet type, laminate type, cylindrical type, flat type, and square type. The battery of a large size used in electric vehicle or the like is used.

Non-aqueous electrolyte secondary batteries of the invention are used in portable information terminal, portable electronic devices, household small power storage unit, motorcycle, electric vehicle, hybrid electric car, etc. However, applications of the non-aqueous electrolyte secondary batteries of the invention are not limited to them alone.

Exemplary embodiments of the invention are more specifically described below. It must be, however, noted that the invention is not limited to these exemplary embodiments alone.

Exemplary Embodiment 1

A longitudinal sectional view of the non-aqueous electrolyte secondary battery in an embodiment of the invention is shown in FIG. 1. In FIG. 1, a positive electrode plate 5 and a negative electrode plate 6 are spirally wound plural times through a separator 7, and is put in a battery case 1. The battery case 1 is cylindrical. A positive electrode lead 5a is drawn out from the positive electrode plate 5, and other end of the positive electrode lead 5a is connected to a sealing plate 2. A negative electrode lead 6a is drawn out from the negative electrode plate 6, and other end of the negative electrode lead 6a is connected to the bottom of the battery case 1. The battery case 1 and leads 5a, 6a are made of metal or alloy having resistance to organic electrolyte solution and electron conductivity. The leads 5a, 6a are made of metal such as iron, nickel, titanium, chromium, molybdenum, copper and aluminum, or their alloy. Preferably, the battery case 1 is made of stainless steel or Al—Mn alloy plate by processing, the positive electrode lead 5a is made of aluminum, and the negative electrode lead 6a is made of nickel.

The battery case may be, in order to reduce the weight, made of various engineering plastics, or combined materials of plastics and metal. An upper insulation ring 8a is disposed above a plate group 4, and a lower insulation ring 8b is disposed between the plate group 4 and the bottom of the battery case 1. Electrolyte solution is injected into the battery case 1. The sealing plate 2 is then placed at the opening of the battery case 1. Thus, the battery casing is set up. At this time, the sealing plate may also have a safety valve. Aside from the safety valve, the battery casing may also include various safety elements hitherto known. Known safety elements include fuse, bimetal, PTC element, and other over-current preventive elements.

Safety measures against elevation of internal pressure of the battery case include a method of forming a cut in the battery case 1, a method of cracking in the gasket, a method of forming a crack in the sealing plate, and a method of cutting the lead plate. As a safety measure, it is also possible to provide the battery casing with a protective circuit having measures against overcharging or over-discharging. The charger may also incorporate a similar protective circuit.

As measure against overcharging, it may be also designed to cut off the current due to elevation of internal pressure of the battery. In this case, a compound for raising the internal pressure may be contained in the compound or electrolyte. The compound for raising the internal pressure includes $Li_2CO_3$, $LiHCO_3$, $Na_2CO_3$, $NaHCO_3$, $CaCO_3$, $MgCO_3$, and other carbonate. The welding method of cap, battery case, sheet, and lead plate. includes known methods such as DC or AC electric welding, laser welding, and ultrasonic welding. As the sealing agent used when disposing the sealing plate, hitherto known compound such as asphalt, or mixture may be used.

A specific manufacturing method of the negative electrode material is explained below.

Elements in powder or block form for composing the negative electrode material were measured at a ratio by weight of Si:M1 element=52:48. The first element is indicated by M1. The second element is indicated by M2. As the first element M1, nickel (Ni) was used. In 100 parts by weight in the sum of Si and M1 by weight, the second element M2 was added at the ratio by weight as designated in Table 1, and material compositions having individual content ratio were prepared. As the second element M2, boron (B) was used. These material compositions were charged into a dissolving cell, and dissolved and mixed at temperature capable of dissolving the compositions sufficiently, and dissolved matter was obtained. The dissolved matter was quenched and solidified by the roll quenching method, and solidified matter was obtained. The solidified matter was heated for 20 hours in inert atmosphere at 900° C. The heated matter was ground in a ball mill, and sorted by sieve. Thus, negative electrode materials A1 to A6 with particle size of about 45 μm or less were prepared. These negative electrode materials A1 to A6 have mutually different boron contents.

Each negative electrode material, 75 parts by weight, was mixed with 20 parts by weight of carbon powder as conductive material, and 5 parts by weight of vinylidene fluoride resin as binder. These mixtures were dispersed in dehydrated N-methyl pyrrolidinone, and slurry was prepared. The slurry was applied on the negative electrode current collector made of copper foil, and then dried and rolled. Thus, the negative electrode plate 6 was prepared.

On the other hand, 85 parts by weight of lithium cobaltate powder was mixed with 10 parts by weight of carbon powder as conductive material, and 5 parts by weight of vinylidene fluoride resin as binder. These mixtures were dispersed in dehydrated N-methyl pyrrolidinone, and slurry was prepared. The slurry was applied on the positive electrode current collector made of aluminum foil, and then dried and rolled. Thus, the positive electrode plate 5 was prepared.

The electrolyte solution was an organic electrolyte solution containing a mixed solvent of ethylene carbonate and methyl ethyl carbonate at ratio of 1:1 by volume, and 1.5 mol/L of $LiPF_6$ dissolved in this mixed solvent.

In this manner, negative electrodes using negative electrode materials A1 to A6 having different boron contents were prepared. Cylindrical secondary batteries were prepared from these negative electrode materials A1 to A6, and batteries A1 to A6 were obtained. The fabricated cylindrical batteries are 18 mm in diameter and 650 mm in height. These batteries were first charged to 4.1 V at a constant current of 100 mA, and then discharged to 2.0 V at a constant current of 100 mA. Such cycle of charging and discharging was repeated. Charging and discharging were conducted in a thermostatic cell at 20° C. Charging and discharging were repeated up to 100 cycles. Then the capacity maintenance rate was calculated. The capacity maintenance rate is the ratio of the discharging capacity after 100 cycles to the initial discharging capacity. Results of measurement are summarized in Table 1.

TABLE 1

| Battery | Negative electrode material | Element M1 | Element M2 Type | Content (parts by weight) | Discharging capacity (mAh) Initial | 100 cycles | Capacity maintenance rate (%) |
|---|---|---|---|---|---|---|---|
| A1 | A1 | Ni | — | 0 | 1985 | 1390 | 70 |
| A2 | A2 | Ni | B | 0.1 | 1980 | 1861 | 94 |
| A3 | A3 | Ni | B | 1 | 1950 | 1813 | 93 |
| A4 | A4 | Ni | B | 10 | 1910 | 1815 | 95 |
| A5 | A5 | Ni | B | 30 | 1904 | 1790 | 94 |
| A6 | A6 | Ni | B | 40 | 1723 | 1602 | 93 |

In Table 1, the batteries A2, A3, A4 and A5 presented an excellent initial discharging capacity of 1900 mAh or more and an excellent capacity maintenance rate of 90% or more. However, the battery A1 was reduced in the discharging capacity in 100 cycles, and presented a small capacity maintenance rate. The battery A6 was slightly small in the initial discharging capacity.

On the other hand, using graphite as the negative electrode material, similar cylindrical batteries were prepared, and the charging and discharging cycle characteristic was measured. As a result, the initial discharging capacity was 1510 mAh, and the capacity maintenance rate in 100 cycles was 95%. That is, the batteries using graphite as the negative electrode material were smaller in the initial discharging capacity than the batteries A2 to A5 of the embodiment.

Exemplary Embodiment 2

Magnesium (Mg) was used as the second element M2 contained in the negative electrode material in exemplary embodiment 1. That is, preparing negative electrode materials B2 to B6 containing Si, Ni and Mg, cylindrical batteries B2, B3, B4, B5, and B6 using these negative electrode materials were prepared. Other composition except the negative electrode material is same as in exemplary embodiment 1. In the obtained batteries, the capacity maintenance rate was measured same as in exemplary embodiment 1. Results of measurement are shown in Table 2.

TABLE 2

| Battery | Negative electrode material | Element M1 | Element M2 Type | Content (parts by weight) | Discharging capacity (mAh) Initial | 100 cycles | Capacity maintenance rate (%) |
|---|---|---|---|---|---|---|---|
| A1 | A1 | Ni | — | 0 | 1985 | 1390 | 70 |
| B2 | B2 | Ni | Mg | 0.1 | 1968 | 1830 | 93 |
| B3 | B3 | Ni | Mg | 1 | 1959 | 1802 | 92 |
| B4 | B4 | Ni | Mg | 10 | 1919 | 1746 | 91 |
| B5 | B5 | Ni | Mg | 30 | 1900 | 1786 | 94 |
| B6 | B6 | Ni | Mg | 40 | 1692 | 1574 | 93 |

In Table 2, batteries B2, B3, B4 and B5 presented an excellent initial discharging capacity of 1900 mAh or more and an excellent capacity maintenance rate of 90% or more. By contrast, the battery B6 was slightly small in the initial discharging capacity.

Exemplary Embodiment 3

Elements in powder or block form for composing the negative electrode material were measured at a ratio by weight of Si:M1 element=52:48. As the first element M1, cobalt (Co) was used. In the total weight of Si, M1 and M2, the element M2 was measured at a ratio by weight as designated in Table 1, and charged at each specific rate, and material compositions were prepared. As the element M2, boron (B) was used. These material compositions were charged into a dissolving cell, and dissolved and mixed at temperature capable of dissolving the compositions sufficiently, and dissolved matter was obtained. The dissolved matter was quenched and solidified by the roll quenching method, and solidified matter was obtained. The solidified matter was heated for 20 hours in inert atmosphere at 900° C. The heated matter was ground in a ball mill, and sorted by sieve. Thus, negative electrode materials C1 to C6 with particle size of about 45 μm or less were prepared. These negative electrode materials C1 to C6 have mutually different boron contents.

In the obtained batteries, the capacity maintenance rate was measured same as in exemplary embodiment 1. Results of measurement are summarized in Table 3.

TABLE 3

| Battery | Negative electrode material | Element M1 | Element M2 Type | Element M2 Content (parts by weight) | Discharging capacity (mAh) Initial | Discharging capacity (mAh) 100 cycles | Capacity maintenance rate (%) |
|---|---|---|---|---|---|---|---|
| C1 | C1 | Co | B | 0 | 1985 | 1390 | 70 |
| C2 | C2 | Co | B | 0.1 | 1962 | 1785 | 91 |
| C3 | C3 | Co | B | 1 | 1952 | 1815 | 93 |
| C4 | C4 | Co | B | 10 | 1946 | 1751 | 90 |
| C5 | C5 | Co | B | 30 | 1940 | 1765 | 91 |
| C6 | C6 | Co | B | 40 | 1703 | 1567 | 92 |

In Table 3, the batteries C2, C3, C4 and C5 presented an excellent initial discharging capacity of 1900 mAh or more and an excellent capacity maintenance rate of 90% or more. By contrast, the battery C1 presented a small capacity maintenance rate. The battery C6 was slightly small in the initial discharging capacity.

Exemplary Embodiment 4

Magnesium (Mg) was used as the second element M2 contained in the negative electrode material in exemplary embodiment 3. That is, negative electrode materials F2 to F6 containing Si, Co and Mg were prepared. On the other hand, without containing Mg, negative electrode material E1 containing Si and Co was prepared. Using these negative electrode materials, cylindrical batteries E1, F2, F3, F4, F5, and F6 were prepared. Other composition except the negative electrode material is same as in exemplary embodiment 1. In the obtained batteries, the capacity maintenance rate was measured same as in exemplary embodiment 1. Results of measurement are shown in Table 4.

TABLE 4

| Battery | Negative electrode material | Element M1 | Element M2 Type | Element M2 Content (parts by weight) | Discharging capacity (mAh) Initial | Discharging capacity (mAh) 100 cycles | Capacity maintenance rate (%) |
|---|---|---|---|---|---|---|---|
| E1 | E1 | Co | — | 0 | 1985 | 1390 | 70 |
| F2 | F2 | Co | Mg | 0.1 | 1958 | 1821 | 93 |
| F3 | F3 | Co | Mg | 1 | 1946 | 1790 | 92 |

TABLE 4-continued

| Battery | Negative electrode material | Element M1 | Element M2 Type | Element M2 Content (parts by weight) | Discharging capacity (mAh) Initial | Discharging capacity (mAh) 100 cycles | Capacity maintenance rate (%) |
|---|---|---|---|---|---|---|---|
| F4 | F4 | Co | Mg | 10 | 1942 | 1767 | 91 |
| F5 | F5 | Co | Mg | 30 | 1939 | 1823 | 94 |
| F6 | F6 | Co | Mg | 40 | 1679 | 1561 | 93 |

In Table 4, batteries F2, F3, F4 and F5 presented an excellent initial discharging capacity of 1900 mAh or more and an excellent capacity maintenance rate of 90% or more. By contrast, the battery E1 presented a small capacity maintenance rate. The battery F6 was slightly small in the initial discharging capacity.

Exemplary Embodiment 5

Elements in powder or block form for composing the negative electrode material were measured at a ratio by weight of Si:M1 element=52:48. As the first element M1, both cobalt (Co) and nickel (Ni) were used. The ratio by weight of cobalt and nickel was Co:Ni=50:50. In the total weight of Si, M1 and M2, the element M2 was measured at a ratio by weight as designated in Table 1, and charged at each specific rate, and material compositions were prepared. As the element M2, boron (B) was used. These material compositions were charged into a dissolving cell, and dissolved and mixed at temperature capable of dissolving the compositions sufficiently, and dissolved matter was obtained. The dissolved matter was quenched and solidified by the roll quenching method, and solidified matter was obtained. The solidified matter was heated for 20 hours in inert atmosphere at 900° C. The heated matter was ground in a ball mill, and sorted by sieve. Thus, negative electrode materials G2 to G6 with particle size of about 45 μm or less were prepared.

That is, negative electrode materials G2 to G6 containing Si, Ni, Co and B were prepared. Without containing B, on the other hand, negative electrode material G1 containing Si, Ni and Co was prepared. Using these negative electrode materials, cylindrical batteries G1, G2, G3, G4, G5 and G6 were prepared. Other composition except the negative electrode material is same as in exemplary embodiment 1. In the obtained batteries, the capacity maintenance rate was measured same as in exemplary embodiment 1. Results of measurement are summarized in Table 5.

TABLE 5

| Battery | Negative electrode material | Element M1 | Element M2 Type | Element M2 Content (parts by weight) | Discharging capacity (mAh) Initial | Discharging capacity (mAh) 100 cycles | Capacity maintenance rate (%) |
|---|---|---|---|---|---|---|---|
| G1 | G1 | Ni + Co | — | 0 | 1985 | 1390 | 70 |
| G2 | G2 | Ni + Co | B | 0.1 | 1976 | 1857 | 94 |
| G3 | G3 | Ni + Co | B | 1 | 1970 | 1872 | 95 |
| G4 | G4 | Ni + Co | B | 10 | 1966 | 1848 | 94 |

TABLE 5-continued

| Battery | Negative electrode material | Element M1 | Element M2 Type | Content (parts by weight) | Discharging capacity (mAh) Initial | 100 cycles | Capacity maintenance rate (%) |
|---|---|---|---|---|---|---|---|
| G5 | G5 | Ni + Co | B | 30 | 1959 | 1841 | 94 |
| G6 | G6 | Ni + Co | B | 40 | 1711 | 1591 | 93 |

In Table 5, the batteries G2, G3, G4 and G5 presented an excellent initial discharging capacity of 1900 mAh or more and an excellent capacity maintenance rate of 90% or more. By contrast, the battery G1 presented a small capacity maintenance rate. The battery G6 was slightly small in the initial discharging capacity.

Exemplary Embodiment 6

Magnesium (Mg) was used as the second element M2 contained in the negative electrode material in exemplary embodiment 5. That is, negative electrode materials H2 to H6 containing Si, Ni, Co and Mg were prepared. On the other hand, without containing Mg, negative electrode material G1 containing Si, Ni and Co was prepared. Using these negative electrode materials, cylindrical batteries G1, H2, H3, H4, H5, and H6 were prepared. Other composition except the negative electrode material is same as in exemplary embodiment 1. In the obtained batteries, the capacity maintenance rate was measured same as in exemplary embodiment 1. Results of measurement are shown in Table 6.

TABLE 6

| Battery | Negative electrode material | Element M1 | Element M2 Type | Content (parts by weight) | Discharging capacity (mAh) Initial | 100 cycles | Capacity maintenance rate (%) |
|---|---|---|---|---|---|---|---|
| G1 | G1 | Ni + Co | — | 0 | 1985 | 1390 | 70 |
| H2 | H2 | Ni + Co | Mg | 0.1 | 1976 | 1818 | 92 |
| H3 | H3 | Ni + Co | Mg | 1 | 1952 | 1776 | 91 |
| H4 | H4 | Ni + Co | Mg | 10 | 1913 | 1722 | 90 |
| H5 | H5 | Ni + Co | Mg | 30 | 1900 | 1748 | 92 |
| H6 | H6 | Ni + Co | Mg | 40 | 1698 | 1579 | 93 |

In Table 6, batteries H2, H3, H4 and H5 presented an excellent initial discharging capacity of 1900 mAh or more and an excellent capacity maintenance rate of 90% or more. By contrast, the battery G1 presented a small capacity maintenance rate. The battery H6 was slightly small in the initial discharging capacity.

In the results of the foregoing exemplary embodiments 1 to 6, when the negative electrode material contains Si, B or Mg as second element M2, and Ni or Co as the first element, batteries having an excellent capacity maintenance rate of 90% or more are obtained. Further, when the content of the second element M2 is in a range of 0.1 to 30 parts by weight, batteries having an excellent initial discharging capacity of 1900 mAh or more and an excellent capacity maintenance rate of 90% or more are obtained. In particular, the battery using the negative electrode material containing Si, first element M1 and second element M2 has a higher initial discharging capacity than the battery using the negative electrode material containing graphite. In the negative electrode material containing Si, first element M1 and second element M2, when the content of the second element M2 is 40 parts by weight, the initial capacity is slightly smaller. Therefore, the content of the second element M2 is particularly preferred to be in a range of 0.1 to 30 parts by weight.

In the exemplary embodiments, the first element M1 is at least one of Ni and Co, but not limited to them, the first element M1 may be at least one element selected from the group consisting of group 2 elements except Mg in the periodic table, transition elements, group 12 elements, group 13 elements except B, and group 14 elements except Si. Various batteries were prepared by using the negative electrode material containing such first element M1, and in the obtained batteries, the initial discharging capacity, discharging capacity in 100 cycles, and capacity maintenance rate were measured. As a result, similar results were obtained.

As a result, similar results as in exemplary embodiments 1 to 6 were obtained. That is, the obtained batteries presented an excellent initial discharging capacity and an excellent capacity maintenance rate.

In the exemplary embodiments 5 and 6, the ratio of Ni and Co used as the first element M1 was Ni:Co=50:50, but not limited to this composition, the mixed composition of the first element may be arbitrary. In this case, too, the same effects as in the exemplary embodiments 5 and 6 were obtained.

Further, in the exemplary embodiments 1 to 6, as the second element M2, B alone or Mg alone was used, but not limited to this composition, the second element may be also an arbitrary mixed composition of B and Mg. In this case, too, the same effects as in the exemplary embodiments 1 to 6 were obtained.

In the exemplary embodiments 1 to 6, the ratio by weight of Si and first element M1 is Si:M1 element=52:48, but not limited to this composition, Si and first element M1 may be used in an arbitrary composition. In this case, too, the excellent effects such as the capacity maintenance rate were obtained same as in the exemplary embodiments 1 to 6.

INDUSTRIAL APPLICABILITY

Thus, according to the composition of the invention, expansion and contraction of particles due to cycles of charging and discharging can be suppressed. Therefore, in the charging and discharging cycles, an excellent capacity maintenance rate is obtained. As a result, the charging and discharging cycle characteristic of the battery is enhanced. Further, an excellent initial discharging capacity is obtained.

What is claimed is:

1. A negative electrode material for a non-aqueous electrode secondary battery comprising:
   Si, a first additional element, and a second additional element,
   wherein said first additional element is selected from the group consisting of Co and mixtures of Ni and Co, and said second additional element is at least one element selected from the group consisting of B and Mg, and
   wherein said second additional element is contained in said negative electrode material for said non-aqueous electrode secondary battery in a range of 0.1 part by weight to 30 parts by weight in 100 parts by weight of the sum of the weights of Si and said first additional element.

2. The negative electrode material for non-aqueous elctrode secondary battery of claim 1, wherein said first additional element is Co.

3. The negative electrode material for a non-aqueous electrode secondary battery of claim 1, wherein said first additional element is a mixture of Ni and Co.

4. A negative electrode material for a non-aqueous electrode secondary battery comprising:

Si, a first additional element, and a second additional element, wherein said first additional element is at least one element selected from the group consisting of Ni and Co, and said second additional element is Mg, and wherein said second additional element is contained in said negative electrode material for said non-aqueous electrode secondary battery in a range of 0.1 part by weight to 30 parts by weight in 100 parts by weight of the sum of the weights of Si and said first additional element.

5. A non-aqueous electrode secondary battery comprising:

a positive electrode, a non-aqueous electrolyte, and a negative electrode, said negative electrode comprising:
Si, a first additional element, and a second additional element, wherein said first additional element is at least one element selected from the group consisting of Ni and Co, and said second additional element is at least one element selected from the group consisting of B and Mg, and wherein said second additional element is contained in said negative electrode material in a range of 0.1 part by weight to 30 parts by weight in 100 parts by weight of the sum of weights of Si and said first additional element.

6. The battery of claim 5, wherein said first additional element is Ni.

7. The battery of claim 5, wherein said first additional element is Co.

8. The battery of claim 5, wherein said first additional element is a mixture of Ni and Co.

* * * * *

UNITED STATES PATENT AND TRADEMARK OFFICE
CERTIFICATE OF CORRECTION

PATENT NO. : 6,576,366 B1  Page 1 of 1
DATED : June 10, 2003
INVENTOR(S) : Fujiwara et al.

It is certified that error appears in the above-identified patent and that said Letters Patent is hereby corrected as shown below:

<u>Title page,</u>
Item [86], PCT No., delete "Oct. 20, 2000" and insert -- Dec. 6, 2000 --.

Signed and Sealed this

Twenty-seventh Day of April, 2004

JON W. DUDAS
*Acting Director of the United States Patent and Trademark Office*